UNITED STATES PATENT OFFICE.

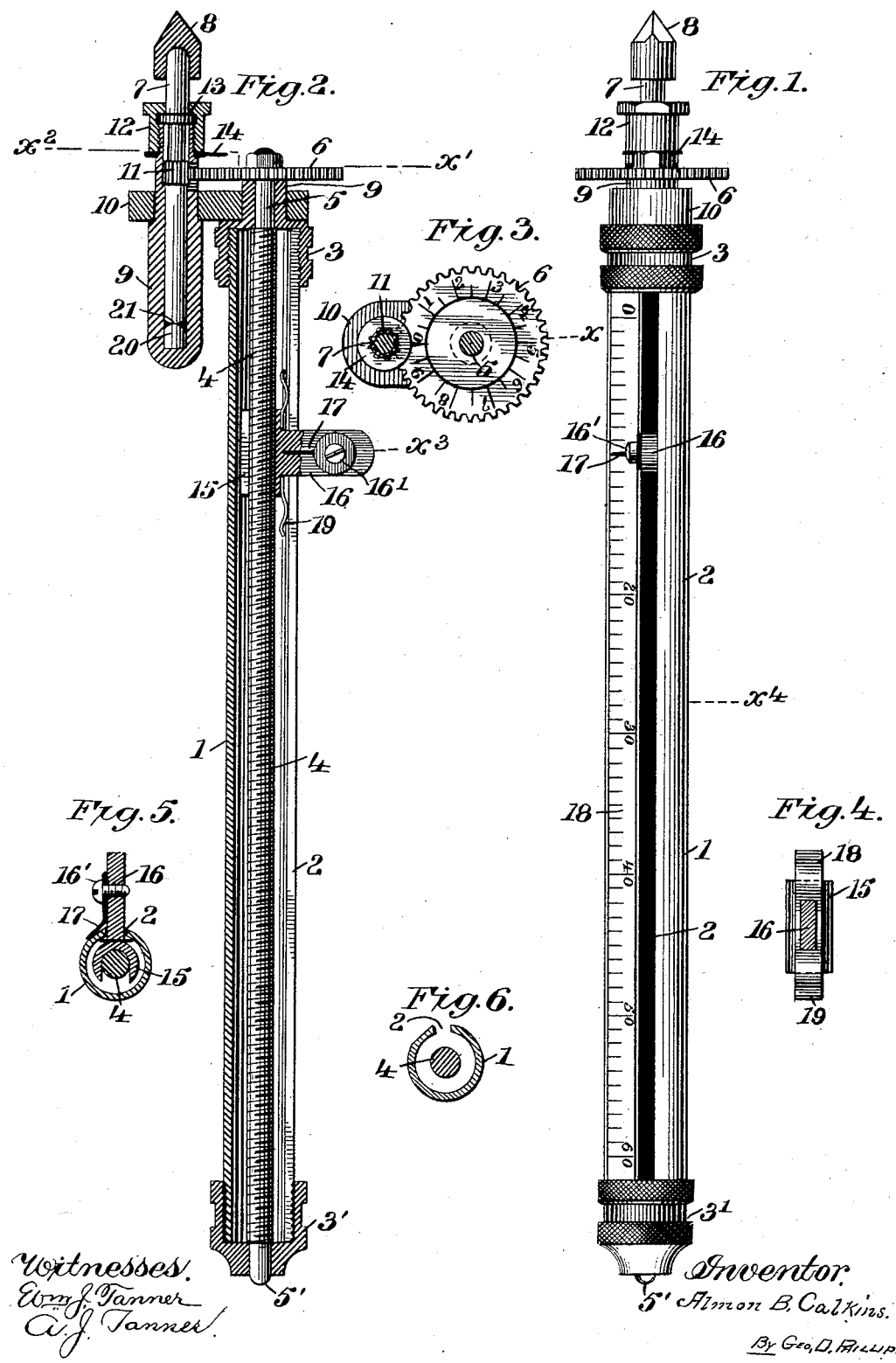
(No Model.)
A. B. CALKINS.
SPEED MEASURE.
No. 435,012. Patented Aug. 26, 1890.

ALMON B. CALKINS, OF BRIDGEPORT, CONNECTICUT.

SPEED-MEASURE.

SPECIFICATION forming part of Letters Patent No. 435,012, dated August 26, 1890.

Application filed April 8, 1890. Serial No. 347,084. (No model.)

*To all whom it may concern:*

Be it known that I, ALMON B. CALKINS, a citizen of the United States, residing at Bridgeport, in the county of Fairfield and State of Connecticut, have invented certain new and useful Improvements in Speed-Counters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to speed-counters, and particularly to that class operated by hand, for obtaining the speed of revolving bodies, as hereinafter more fully described, and particularly pointed out in the claims.

The object of my invention is to construct an instrument that will show or indicate upon a linear scale the speed of any revolving body.

My invention consists of a shell or casing, a fine-threaded shaft placed longitudinally therein and journaled in bearings at the ends of such shell or casing, a toothed dial-wheel on one end of the threaded shaft, a contact-spindle, a pinion on such spindle to engage with the dial-gear, a threaded traveler engaging the threaded shaft, a graduated scale on the outer surface of the casing, that portion of the traveler projecting through the casing having a pointer or indicating-finger to move over the scale, and means to expedite the return of such traveler and pointer back to zero.

To more fully understand my invention, reference is had to the accompanying drawings, in which—

Figure 1 represents a full-size view and top plan of the counter, showing the graduated scale, pointer, and dial-wheel. Fig. 2 represents a longitudinal sectional view of the casing and contact-spindle through dotted line X of Fig. 3. Fig. 3 represents an end view through line X' and X² of Fig. 2. Fig. 4 represents a detail view. Fig. 5 represents a sectional view of the casing, threaded shaft, and traveler through dotted line X³ of Fig. 2. Fig. 6 represents a sectional view of the casing and threaded shaft through dotted line X⁴ of Fig. 1.

Its construction and operation are as follows:

1 represents the shell or casing; 2, a longitudinal slot cut through one side of the casing 1; 3 3', caps mounted on each end of such casing; 4, a threaded shaft placed longitudinally within casing 1; 5 5', end bearings of the threaded shaft journaled in the caps 3 3'; 6, a dial-gear mounted on the end of threaded shaft 4; 7, a contact-spindle; 8, contact-point of same; 9, spindle-holder attached to bracket 10, which bracket is in turn secured to cap 3; 11, a pinion on spindle 7 to engage with the teeth of dial-gear 6; 12, a cap mounted on a reduced part of the spindle-holder 9 to engage with the collar 13 of spindle 7, to retain such spindle within said holder and also rigidly secure pointer 14 against the shoulder formed by a reduced portion of holder 9; 15, a forked threaded traveler engaging with threaded shaft 4; 16, a stem of such traveler projecting through slot 2 of casing 1; 17, a pointer attached to stem 16 by screw 16', which pointer is moved along the scale 18 of casing 2; 19, a spring acting against the interior of the casing to keep traveler 15 engaged with screw 4, and 20 a hardened step at the bottom of spindle-holder 9, against which the end 21 of spindle 7 runs.

The dial-gear 6 and pinion 11 are supposed to be geared ten to one. The pitch of screw 4 is also one hundred threads per inch; but to avoid confusion in the drawings the exact number of teeth and threads are not represented. Ten revolutions of pinion 11 will make one revolution of dial-gear 6 and move the pointer 17 on scale 18 one one-hundredth of an inch. One-tenth on such scale will represent ten revolutions of dial 6 and one hundred revolutions of spindle 7. The graduations on the scale are in tenths; but in practice these will be subdivided into fiftieths, which equal twenty revolutions.

In applying the instrument to determine the speed of a revolving shaft the pointer 14 is first located at the zero-mark on the dial-gear 6 and the pointer 17 brought to the zero-mark on scale 18. The end 8 of spindle 7 is brought in contact with the center of the shaft. Such spindle will then transmit the motion through pinion 11, dial-gear 6, and screw 4 to traveler 15 and move pointer 17 along the scale 18. When the test is completed, the pointer 17 will indicate on the scale the number of revolutions from tens up to thousands, and the dial will show in tens. The scale is six inches long. Each tenth of an inch, as before stated, represents one hundred revolutions, and six inches sixty hundred or six thousand. The lower end of the traveler 15 being forked, (see Fig. 5,) the upper portion only threaded, and the threaded connection between such traveler and screw maintained by the spring 18, an upward pull on stem 16 will disengage such traveler from the screw, when it can be moved along slot 2 back to zero.

This instrument may be used to register the revolutions of a shaft running in the opposite direction from that above described by simply moving the pointer 17 to the 60-mark on the scale and reading toward zero.

The construction of the counter is such that it is particularly adapted for determining high speeds, giving a continuous count without a train of decimal-wheels.

Having thus described my invention, what I claim as new, and desire to secure by Letters Patent, is—

1. The combination, in a speed-counter, of a shell or casing, a longitudinal slot therein communicating with the interior of such casing, a threaded shaft placed longitudinally within said casing and journaled therein and arranged to move freely on such journals, a threaded traveler engaging the threaded shaft, and means, substantially as shown, to preserve such engagement, so that such traveler may be moved by such screw, or independent of the same, a portion of such traveler projecting through the slot of the casing, such projecting end carrying a pointer to be moved along the scale of the casing, a dial-gear placed on the end of the threaded shaft and outside of the casing, with a spindle having a pinion thereon to engage with the dial-gear, a receptacle or holder in which said spindle is journaled, and means, substantially as shown, to attach such holder to the casing, said spindle transmitting its motion through its pinion to the dial-gear and thence to the threaded shaft, substantially as shown.

2. The combination, in a speed-counter, of the casing 1, having slot 2, caps or bearings 3 3', threaded shaft 4, journaled in such caps, threaded traveler 16, engaging the threaded shaft, spring 18 to keep such traveler engaged with the threaded shaft, said traveler arranged to be lifted out of engagement with the threaded shaft and moved independently over the surface of such shaft, end 16 of such traveler projecting through the slotted casing and having a pointer thereon to engage with the scale of the casing, dial-gear 6, combined with spindle 7, journaled in spindle-holder 9, and pinion 11 on such spindle to engage with the dial-gear, substantially as described.

3. The combination, in a speed-counter, of the spindle-holder 9, spindle 7, journaled thereon, step 20 at the bottom of such holder to sustain the end pressure on such spindle, cap 12, engaging collar 13 of the spindle against such step and also rigidly securing pointer 14 in position, and pinion 11, mounted on said spindle, to engage with the dial-gear 6 of the threaded shaft 4, all substantially as described, and for the purpose set forth.

In testimony whereof I affix my signature in presence of two witnesses.

ALMON B. CALKINS.

Witnesses:
 GEO. D. PHILLIPS,
 SIG. LOEWITH.